A. BEARSE.
ANCHOR PLATE FOR GUYS.
APPLICATION FILED JAN. 11, 1911.
1,202,667.
Patented Oct. 24, 1916.
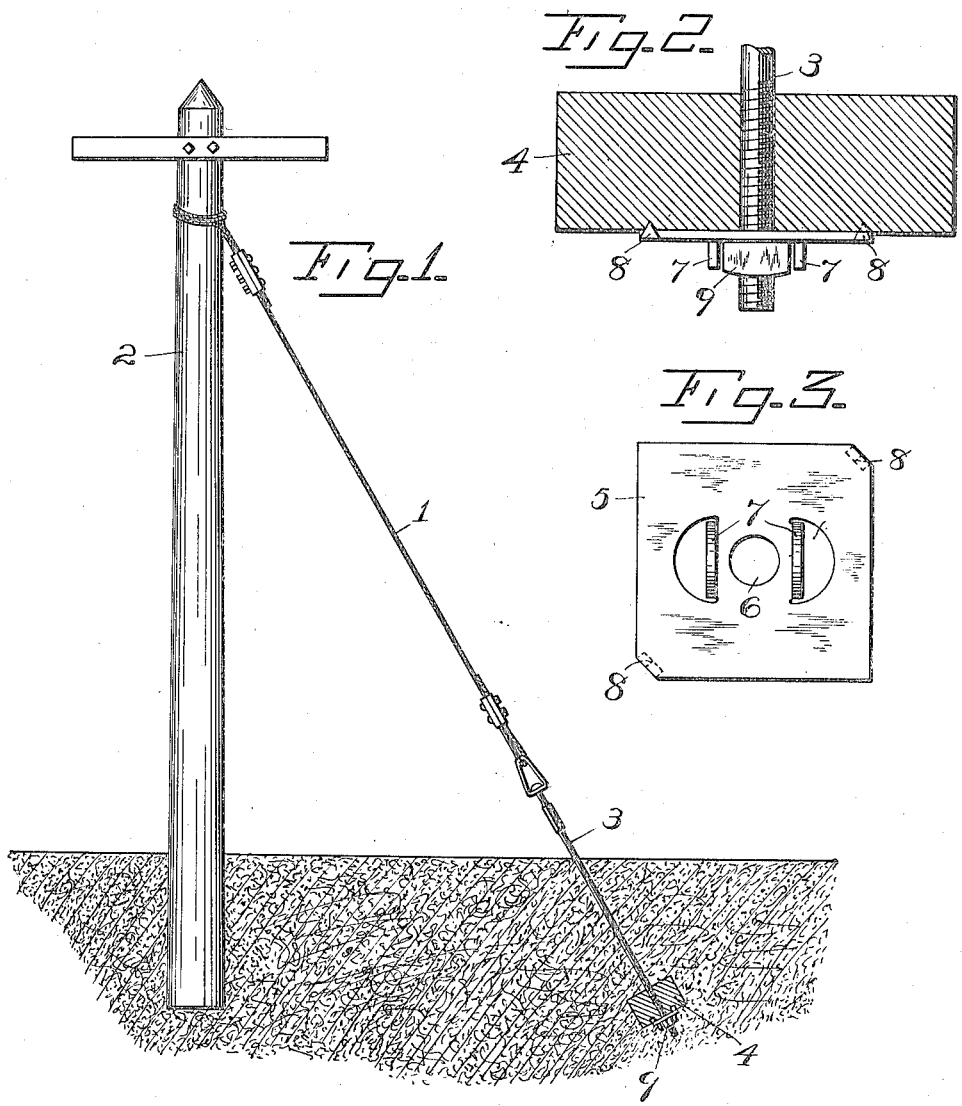
WITNESSES:
Chas. F. Young
T. Davis
INVENTOR.
Aaron Bearse
BY Parsons Hall Bodell
ATTORNEY.

UNITED STATES PATENT OFFICE.

AARON BEARSE, OF SYRACUSE, NEW YORK.

ANCHOR-PLATE FOR GUYS.

1,202,667. Specification of Letters Patent. Patented Oct. 24, 1916.

Application filed January 11, 1911. Serial No. 602,090.

*To all whom it may concern:*

Be it known that I, AARON BEARSE, of Syracuse, in the county of Onondaga and State of New York, have invented a certain new and useful Anchor-Plate for Guys, of which the following is a specification.

This invention has for its object a particularly simple and efficient means for securing guys to anchors therefor; and it consists in the combinations and constructions hereinafter set forth and claimed.

In describing this invention reference is had to the accompanying drawing in which like characters designate corresponding parts in all the views.

Figure 1 is an elevation, partly in section, illustrating my invention as applied to a guy for a pole. Fig. 2 is an elevation of the lower end of the guy, and the means for securing such end to the anchor, the anchor being shown in section. Fig. 3 is a plan of said means. Fig. 4 is a sectional view taken diagonally through the part shown in Fig. 3.

1 is a guy here shown as fixed at its upper end to a pole 2, and as having a threaded rod 3 at its lower end for attachment to the anchor 4, which is usually a beam, tie, etc. The rod 3 is connected to the major part of the guy by a swivel which permits turning of the rod.

The means for securing the guy or rod 3 thereof to the anchor, as here shown comprises a member having an opening, and means for holding a nut alined with the opening, and preventing the same from turning, said nut receiving the lower end of the threaded rod 3.

As here shown said member is a sheet metal bearing plate 5 having a central opening 6, and ears 7 struck therefrom on opposite sides of the opening, the plate also having prongs 8 formed by folding diagonally opposite corners at a right angle to the general plane of the plate 5, these prongs entering the under side of the anchor 4.

9 is a nut arranged between the ears 7 and being locked from turning movement thereby, such nut receiving the lower end of the rod 3 which passes through the anchor 4, the opening 6 of the plate 5, and threads into the nut 9. In use the plate 5 is first placed in position on the anchor and the threaded rod 3 passed through the anchor and plate and the nut 9 turned on the rod, and the rod moved endwisely to place the nut 9 between the ears 7 of the bearing plate. The guy may be tightened by turning the rod 3 in the nut 9. Thus the nut performs the function of a turn buckle.

This means for securing guys to anchors is particularly simple in construction and of great advantage, for the reason that it can be quickly applied to miscellaneous assortment of anchors.

What I claim is:

In combination, a guy having a threaded swiveled rod at one end, an anchor, and means for securing the rod to the anchor comprising a rod extending through the anchor and extending below the lower face thereof, a nut threading on the rod, a plate, interposed between the nut and the anchor and having means coacting with the anchor to hold said plate from turning and means for holding the nut, substantially as and for the purpose described.

In testimony whereof, I have hereunto signed my name in the presence of two attesting witnesses, at Syracuse, in the county of Onondaga, in the State of New York, this 30th day of December, 1910.

AARON BEARSE.

Witnesses:
WM. CORNELL BLANDING,
C. C. SCHOENECK.